May 20, 1952
C. SCHURMAN
2,597,678
YARDING DEVICE FOR CUTOFF SAWS
Filed Aug. 28, 1946
7 Sheets-Sheet 1
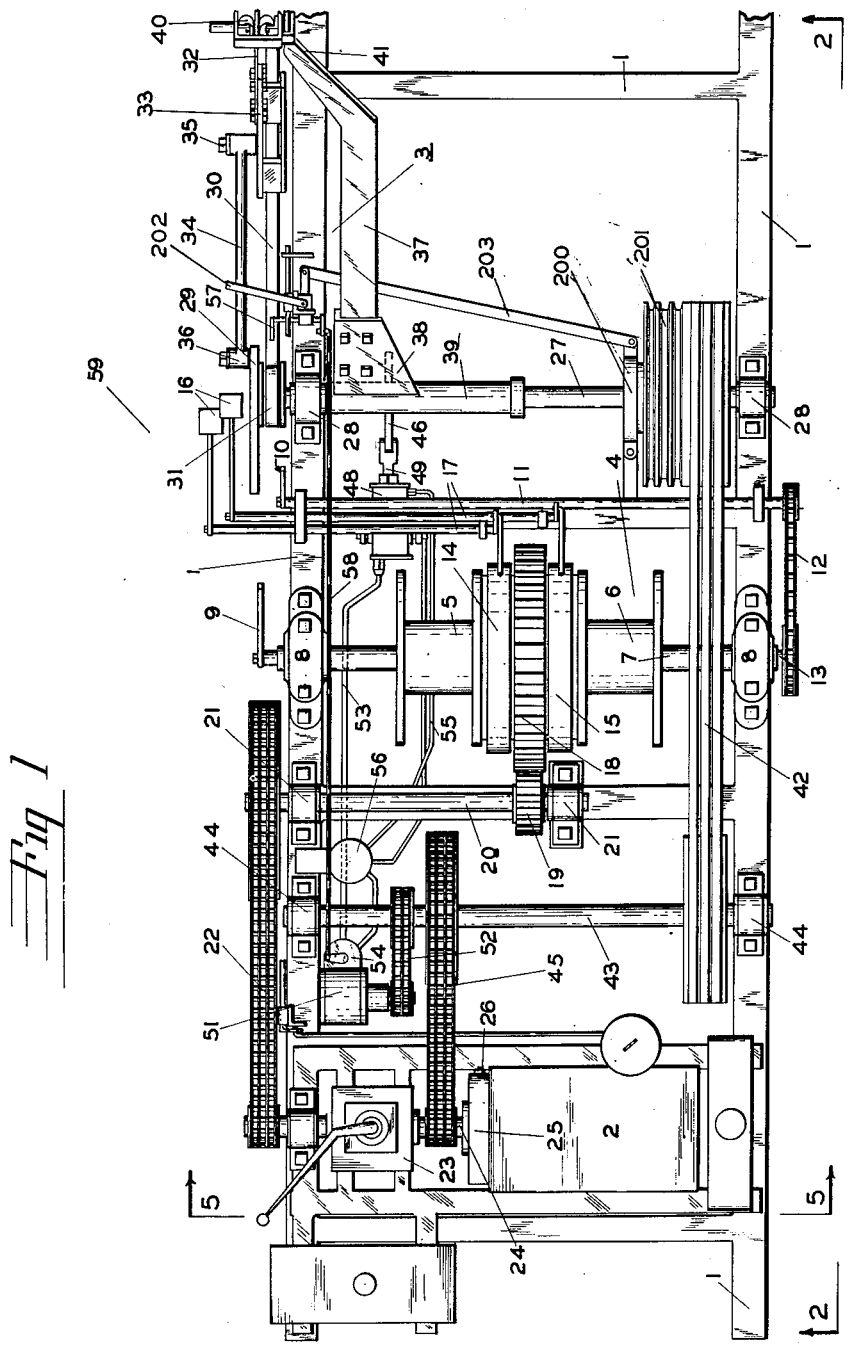
Fig. 1
INVENTOR
CLYDE SCHURMAN
BY 
ATTORNEY May 20, 1952 — C. SCHURMAN — 2,597,678
YARDING DEVICE FOR CUTOFF SAWS
Filed Aug. 28, 1946 — 7 Sheets-Sheet 2

INVENTOR.
CLYDE SCHURMAN
BY
ATTORNEY

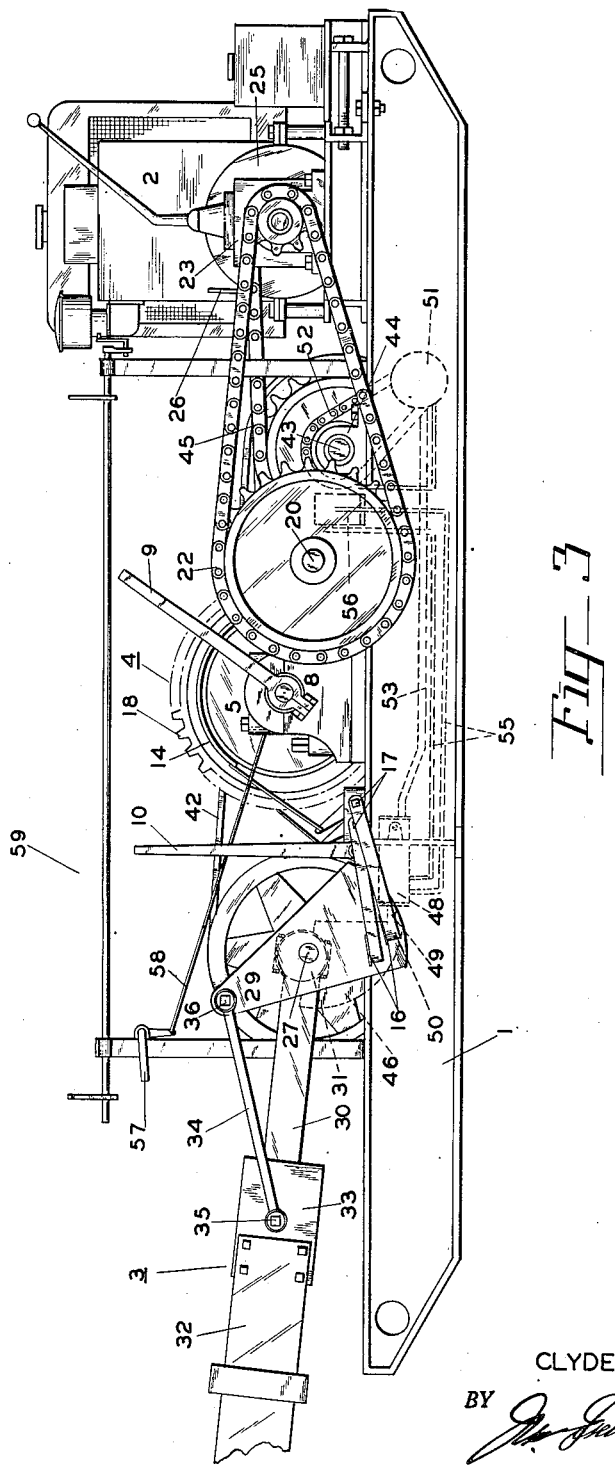

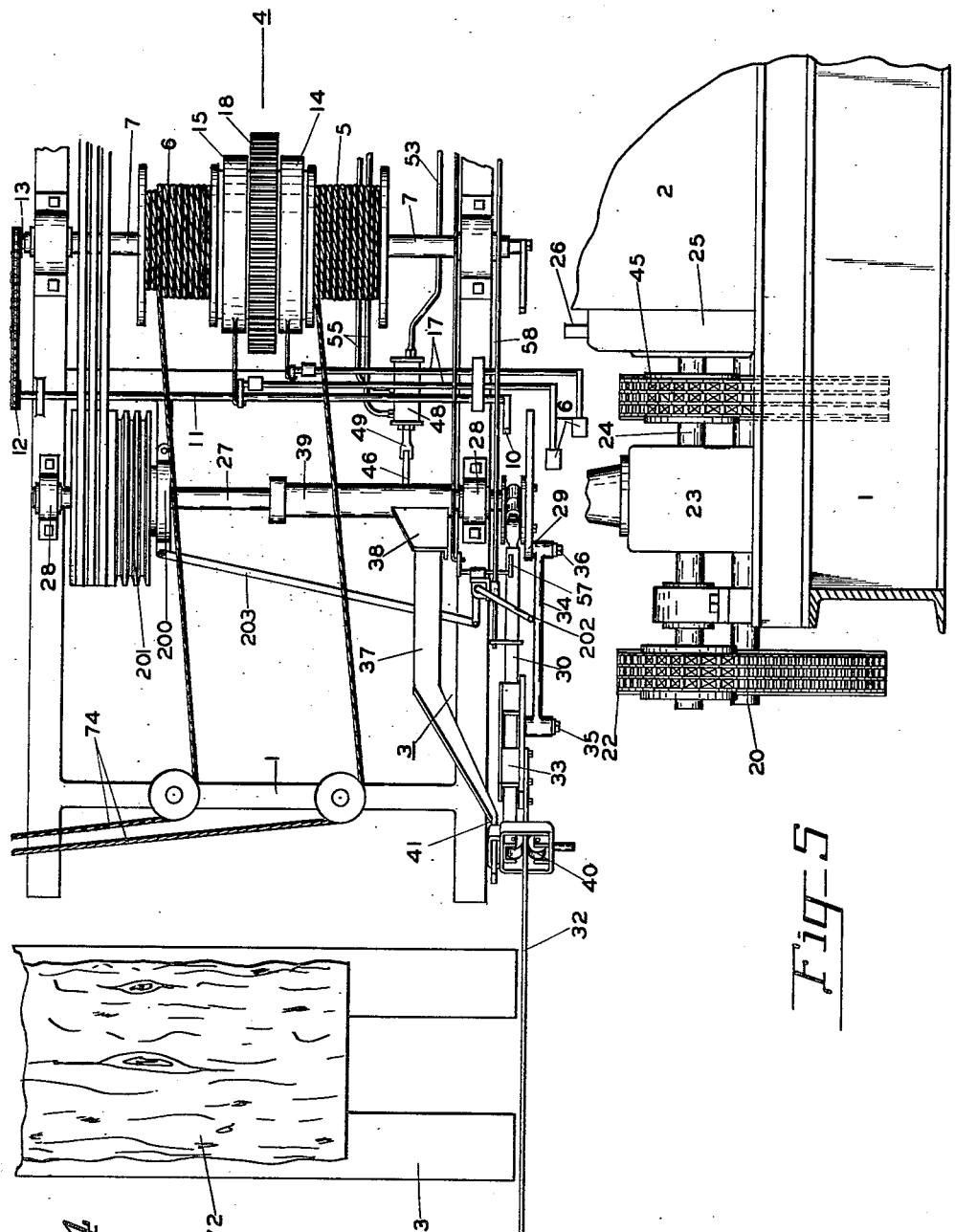

May 20, 1952   C. SCHURMAN   2,597,678
YARDING DEVICE FOR CUTOFF SAWS
Filed Aug. 28, 1946   7 Sheets-Sheet 5

INVENTOR
CLYDE SCHURMAN
BY
ATTORNEY

May 20, 1952  C. SCHURMAN  2,597,678
YARDING DEVICE FOR CUTOFF SAWS
Filed Aug. 28, 1946  7 Sheets-Sheet 6
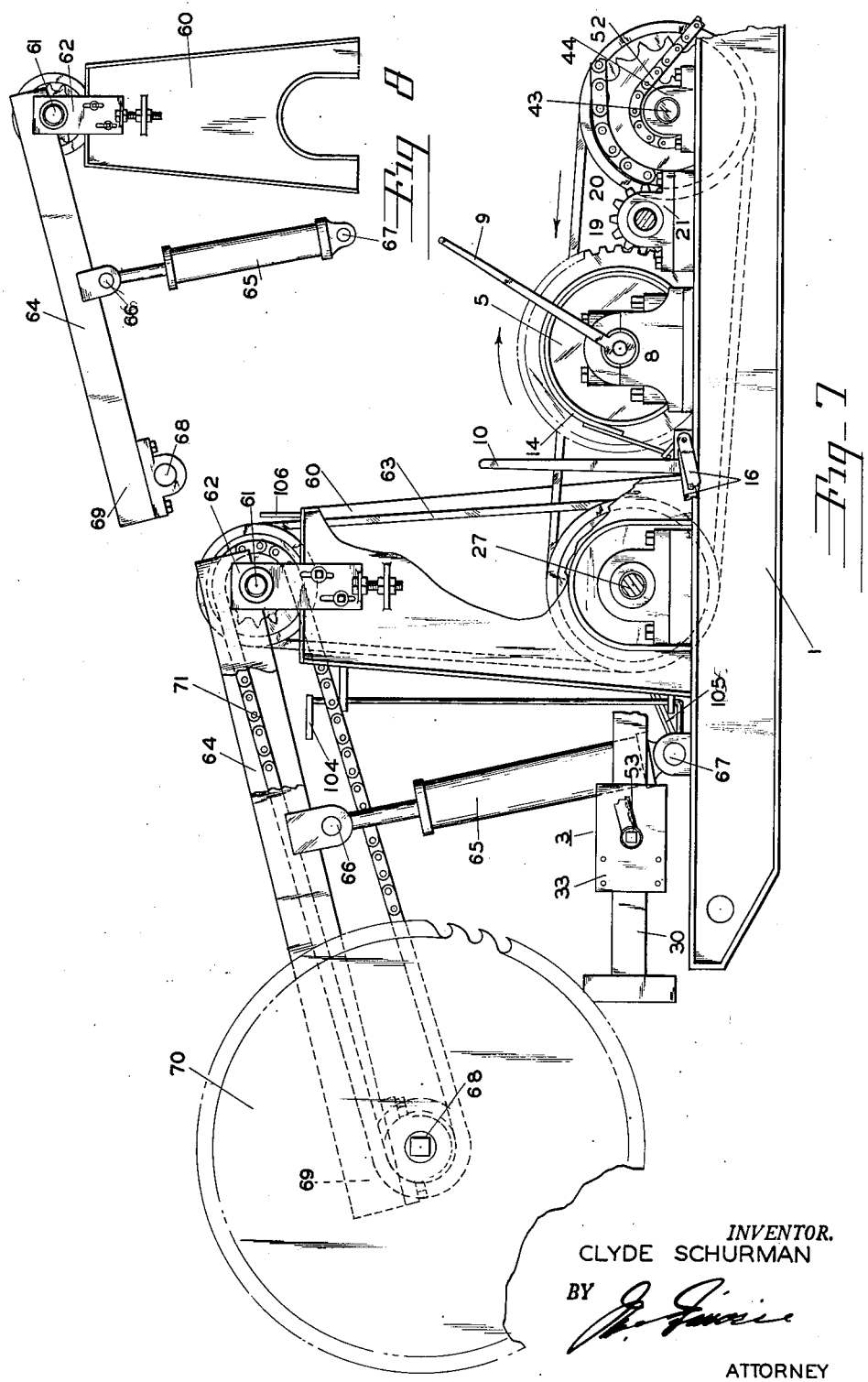
INVENTOR.
CLYDE SCHURMAN
BY
ATTORNEY

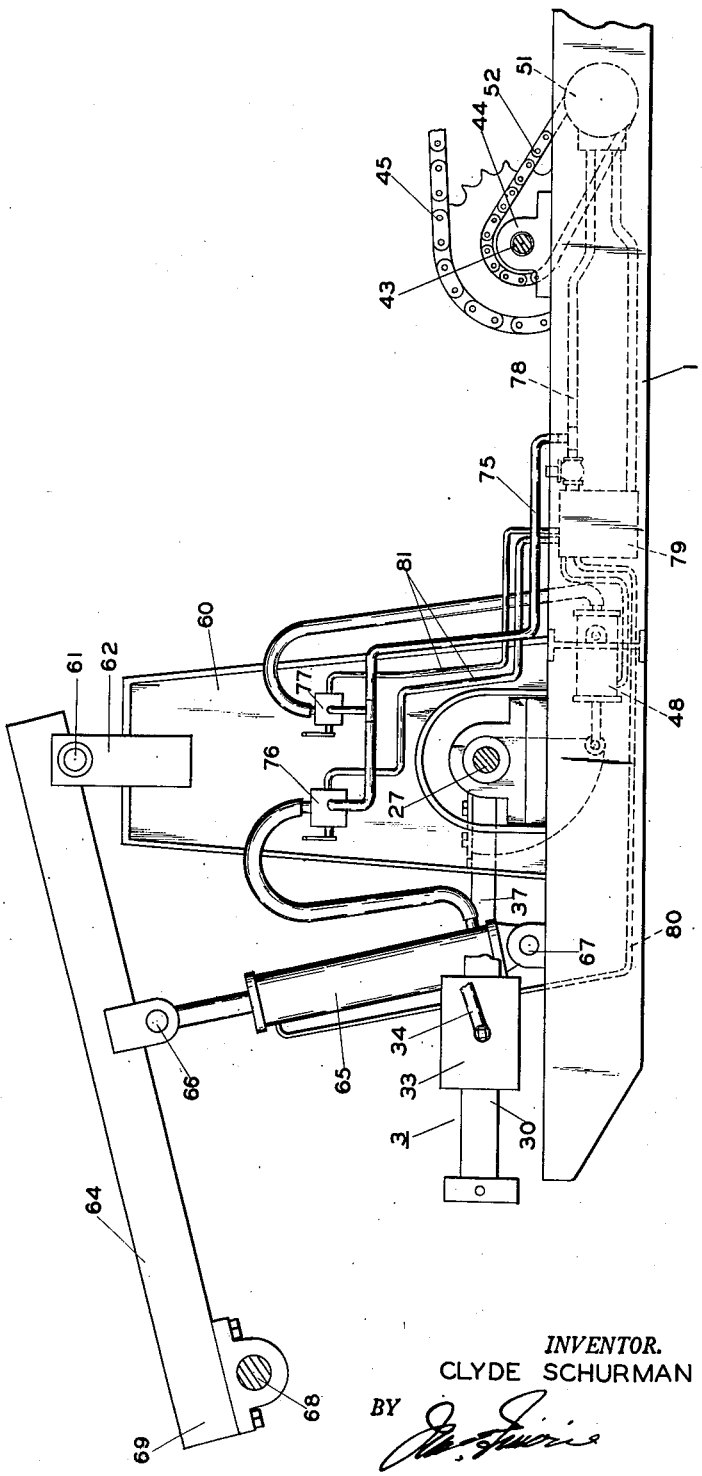

Patented May 20, 1952

2,597,678

UNITED STATES PATENT OFFICE 2,597,678

YARDING DEVICE FOR CUTOFF SAWS

Clyde Schurman, Woodland, Wash.

Application August 28, 1946, Serial No. 693,558

1 Claim. (Cl. 143—92)

This invention relates to a yarding and cutoff saw combination and is particularly related to the cutting of logs.

The primary object of the invention is to provide a machine having either a drag saw or a circular saw for cutting logs to length, at the same time having hoisting drums for pulling in the logs to be cut off.

The outstanding feature of the combination resides in the fact that the speed of the saw is maintained at a constant rate driven directly from the motor while the hoisting drums are driven through a variable speed transmission providing for the extra power required for the yarding in of the logs.

A further object of the invention is the combination and mounting of all these features on one frame.

These and other incidental objects will be apparent in the drawings, specification and claim.

Referring to the darwings:

Figure 1 is a plan view of my assembled combination log yarding and cutoff machine, some of the parts broken away for convenience of illustration.

Figure 3 is a side view taken from the opposite side of that shown in Figure 2.

Figure 4 is a fragmentary plan view illustrating the hoisting drums yarding in a log to be cut to length.

Figure 5 is an end fragmentary view, taken on line 5—5 of Figure 1 illustrating my method of taking the power from the motor directly to the saw assembly drive and from the transmission to the hoisting drum assembly.

Figure 7 is a fragmentary side view of Figure 6, looking in the direction indicated on line 7—7 of Figure 6.

Figure 8 is a fragmentary side view of the circular saw frame assembly removed from the machine.

Figure 9 is a fragmentary side view of the circular saw assembly mounted upon the frame of the machine, but particularly this view illustrates the piping assembly for controlling the hydraulic cylinder for lifting the circular saw frame and also in the operation of the drag saw frame.

In the drawings:

Figure 2:
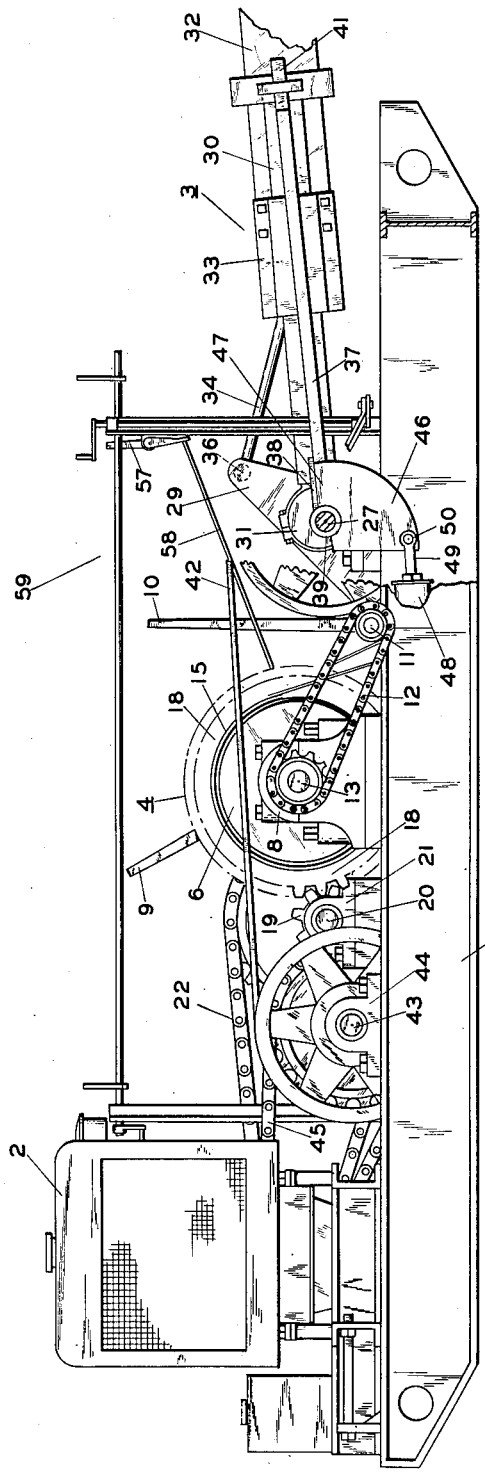
Figure 2 is a side view, taken on line 2—2 of Figure 1, looking in the direction indicated, parts broken away for convenience of illustration.
Figure 6:
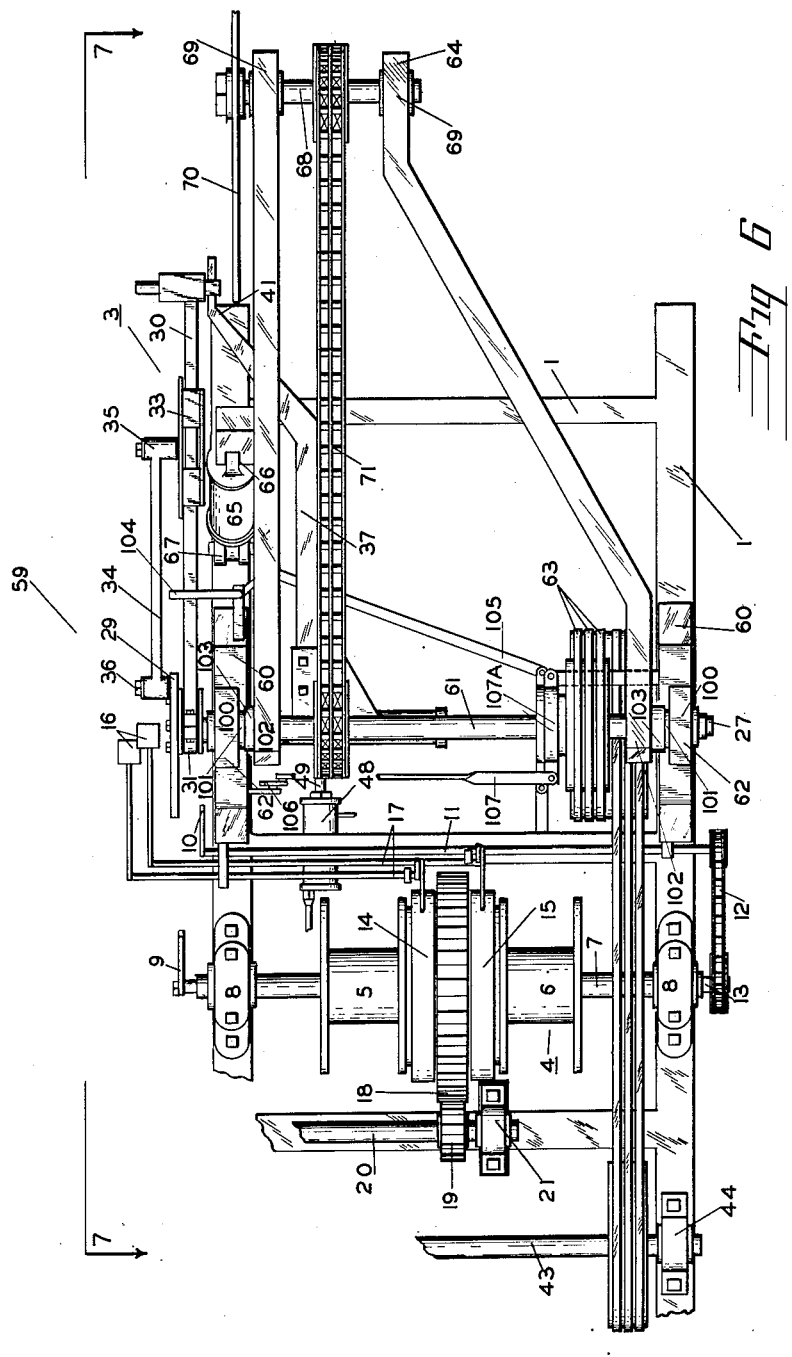
Figure 6 is a fragmentary plan view illustrating a circular cutoff saw assembly mounted to the machine in combination with the drag saw assembly.

My combination log yarding and cutoff machine consists of a portable main frame 1 consisting of longitudinal skids or runners connected by cross members, having a power plant 2 mounted on one of its ends, and a drag saw assembly 3 mounted on its opposite end. A hoisting assembly 4 is mounted midway the length of the frame.

I will first describe the hoisting assembly 4. This assembly consists of the usual drums 5 and 6 mounted to a third shaft 7 journalled within suitable bearings 8. The drums 5 and 6 have the usual clutch assemblies therein controlled by the control levers 9 and 10. The control lever 9 operates the clutch assembly direct in the usual manner, but I have provided a clutch operating shaft 11 for operating the clutch within the drum 6 through a chain 12 connected to the shaft 11 and to the clutch shaft 13, the shafts having suitable sprockets on which the chain is trained for operating the clutch.

The drums 5 and 6 are also held from rotation by the brake assembly bands 14 and 15 operated by the brake pedals 16 through the cross shafts 17. Thus far with the exception of the control levers the hoisting drum assembly is of the standard design. This assembly is driven through the ring gear 18 from the pinion 19 that is fixed to a second shaft 20, which in turn is journalled within bearings 21 and driven through the chain 22. The chain 22 is driven from the transmission 23, which is of a variable speed type, and is driven by the transmission drive shaft 24 into the clutch assembly 25 of the motor 2. The clutch operating lever 26 operates the clutch within the housing 25. This clutch is of a standard well known design.

I will now describe the drag saw assembly 3, which consists of a fourth shaft 27 mounted within bearings 28. This fourth shaft has a crank 29 keyed to one of its ends for driving the drag saw. The drag saw consists of a cross head guide 30 mounted to the eccentric assembly 31 forming part of the fourth shaft 27. The drag saw 32 is fixedly secured to the cross head 33 which is slidably mounted on the cross head guide 30. The cross head 33 is moved along the guide 30 by the connecting rod 34, which is pivotally mounted to the cross head at 35 and to the crank 29 at 36. The cross head guide 30 is maintained at right angles to the fourth shaft 27 and longitudinal of the frame 1 by the bracing arm 37. The bracing arm 37 is fixedly mounted to the bracket 38, which forms part of the bearing tube 39 rotatably mounted upon the fourth shaft 27.

I am covering in a separate application the structure of this drag saw assembly, featuring the brace 37 for maintaining the cross head and the cross head guide in fixed relative alignment with the machine.

Guide rollers 40 are fixedly mounted to the outer end of the cross head guide 30. The outer end 41 of the brace 37 is pivotally and slidably mounted to the outer end of the guide bar 30. The fourth shaft 27 is driven by the belt 42 from a first shaft 43 mounted within bearings 44. The first shaft 43 is driven by the chain 45 from the drive shaft 24 directly from the motor 2.

The method of driving the hoisting assembly 4 and the drag saw assembly 3 is the highlight of this invention. The saw assembly is driven at a constant speed from the motor 2 through the driving assembly above described, while the hoisting assembly 4 is driven through the variable speed transmission 23 allowing the increase of leverage delivered by the motor to the hoisting assembly through the transmission when desired without effecting the speed of the operation of the saw assembly.

Referring to Figures 1, 2 and 3, a lever arm or quadrant 46 is fixedly secured to the bearing tube 39 and the brace 38 at 47. This lever is operated from the hydraulic cylinder 48 through the piston rod 49 which is pivotally mounted at 50 to the lever 46. A hydraulic pump 51 is mounted to the frame 1 and is driven by the drive chain 52 from the first shaft 43. Hydraulic fluid is delivered through the pipe 53 from the control valve 54 connected to the pump 51 to the cylinder 48 for operating the same. Bleeder lines 55 return the hydraulic liquid from the cylinder 48 to the sump tank 56. I do not wish to make claim to the hydraulic control piping and mechanism, as this can be of any well known system.

The hydraulic valve 54 is controlled by the control lever 57 through the connecting rod 58. This brings all of the control levers to a control station at 59.

Referring to Figures 6, 7, 8 and 9, I have illustrated the mounting of a demountable circular saw assembly to my new and improved log yarding and cutoff machine. This mount consists of an upright bearing frame 60 mounted on top of the frame 1 over each bearing 28 of the fourth shaft 27. A cross shaft 61 is journalled within bearings 62 and is driven by the belts 63 from the fourth shaft 27. A saw frame 64 is pivotally mounted to the top of the frames 60 at 100 in sleeves 101 on shaft 61 by the bearings 102 and 103, said bearings forming parts of the frame 64. This frame is also mounted upon the piston rod of the hydraulic cylinder 65 at 66. The cylinder 65 is pivotally mounted to the frame 1 at 67, the operation of which will be later described.

A saw arbor 68 is journalled within bearings on the outer ends 69 of the saw frame 64 consisting substantially of an A-frame having one side member disposed along one side runner of frame 1 and another side member converging outwardly in relative close proximity thereto to take arbor 68 beyond one end of frame 1 and the usual circular saw 70 is mounted thereon. The saw is driven through the drive chain 71 from the cross shaft 61. The drag saw assembly 3 and the circular saw assembly may work together or separately. The circular saw is provided for the small logs while the drag saw is provided for the sawing of the larger logs.

I will now describe the general operation of my new and improved log yarding and cutoff saw machine. Referring to Figure 4, the log 72 is being yarded in on the skids 73 to the drag saw 32 of the drag saw assembly 3 by the cables 74 wound on the drums 5 and 6 of the hoisting assemblies 4. As described above, the hoisting assembly 4 is operated through the second shaft 20, drive chain 22 and transmission or speed changing gearing including reduction gearing 23 from the power plant 2. The transmission reduces the speed to the desired amount in order to haul the log over the surface of the ground and up over the skidways 73.

When the log has been brought into place under the drag saw the drag saw is lowered on to the log by the operation of the control lever 57, control rod 58 operating the valve 54 allowing the liquid from the hydraulic cylinder 48 to bleed back into the reservoir 56, allowing the saw assembly to lower itself on to the log. As stated above the primary object of my invention is to operate the saw assembly at a constant rate of speed through the drive chain 45, first shaft 43, belt 42 to the fourth shaft 27 from the power plant 2 and providing a change of speed for the driven chain 22, second shaft 20 and the hoisting drums 4 in order to meet the varied speeds required in the yarding in of the log.

In the operation of the circular saw assembly shown in Figures 6, 7, 8 and 9 a slightly modified form of hydraulic controls is used. The pumping unit 51 operates either the drag saw assembly or the circular saw assembly as above described in the operation of the drag saw assembly. Hydraulic fluid is delivered from the pump 51 through the piping 75 into the valves 76 and 77. The valve 77 controlling the hydraulic piston in fluid for operating the hydraulic cylinder 48 controlling the raising and lowering operation of the drag saw assembly 3 while the valve 76 operates and controls the operation of the hydraulic cylinder 65 for raising or lowering the A-frame 64 of the circular saw assembly. The usual by-pass pressure relief valve is provided within the hydraulic line 78 (Fig. 9) from the pump 51 by-passing the oil into the reservoir 79. The return lines 80 and 81 are provided for returning the hydraulic fluid to the reservoir 79 in the operation of the system.

The operation of the saw 70 is controlled by clutch 107A (Fig. 6) through the operating lever 106 and link 107. The operation of the drag saw 32 is controlled by the clutch 200 (Fig. 1) throwing the fourth shaft 27 in or out of gear with the pulley 201, which is driven by the belt 42; said clutch 200 is operated by the lever 202 through the link 203. In other words either saw can be thrown out of gear with the driving belt 42, or both of them may be thrown out of gear at the same time.

I do not wish to be limited to the exact mechanical structure or combination of parts, as other mechanical equivalents may be substituted still coming within the scope of my claim.

What I claim as new is:

A yarding apparatus comprising a main frame, skids on said frame for the ready portability thereof, a power plant providing a constant speed source mounted at one corner of said frame, a drive shaft for said power plant, a variable speed transmission connected to said drive shaft, a first shaft parallel to said drive shaft and mounted on said frame adjacent said power plant, a driving connection between the drive shaft of said power plant and said first shaft to drive said first shaft at a constant rate of speed, a drive shaft for said transmission, a second shaft journalled on said frame parallel to said first shaft, a driving connection between the drive shaft for the transmission and said second shaft, a third shaft journalled on said frame parallel to said first and second shafts, yarding drums on said third shaft, a driving connection between said second shaft and said third shaft for driving said third shaft at variable rates of speed, a fourth shaft journalled on said frame in parallel relation to said first, second and third shafts, a driving connection between said fourth shaft and said first shaft for driving said fourth shaft at a constant rate of speed, whereby when a saw is mounted on said fourth shaft to be driven at a constant rate of speed, the speed of said third shaft may be varied to address logs of different sizes to the saw on said fourth shaft.

CLYDE SCHURMAN.

REFERENCES CITED

The following references are of record in the file of this patent:

UNITED STATES PATENTS

| Number | Name | Date |
|---|---|---|
| 285,982 | Fachmon | Oct. 2, 1883 |
| 606,051 | Cunningham | June 21, 1898 |
| 669,956 | Henry | Mar. 12, 1901 |
| 825,518 | Cox | July 10, 1906 |
| 1,001,272 | Howard | Aug. 22, 1911 |
| 1,014,500 | Martens | Jan. 9, 1912 |
| 1,609,651 | McMillan | Dec. 7, 1926 |
| 1,624,285 | Siders | Apr. 12, 1927 |
| 1,842,419 | Morris | Jan. 26, 1932 |
| 2,096,305 | Miller | Oct. 19, 1937 |
| 2,365,408 | Hillyer | Dec. 19, 1944 |
| 2,499,168 | Schurman | Feb. 28, 1950 |

FOREIGN PATENTS

| Number | Country | Date |
|---|---|---|
| 557,731 | France | May 9, 1923 |